United States Patent
Dierickx

(10) Patent No.: US 10,489,851 B2
(45) Date of Patent: Nov. 26, 2019

(54) SUBMISSION AND MANAGEMENT OF PROJECT BIDS

(71) Applicant: Brandon Dierickx, Morrison, CO (US)

(72) Inventor: Brandon Dierickx, Morrison, CO (US)

( * ) Notice: Subject to any disclaimer, the term of this patent is extended or adjusted under 35 U.S.C. 154(b) by 534 days.

(21) Appl. No.: 15/219,718

(22) Filed: Jul. 26, 2016

(65) Prior Publication Data

US 2017/0032457 A1 Feb. 2, 2017

Related U.S. Application Data

(60) Provisional application No. 62/198,107, filed on Jul. 28, 2015.

(51) Int. Cl.
| | |
|---|---|
| *G06Q 30/00* | (2012.01) |
| *G06Q 30/08* | (2012.01) |
| *G06Q 50/16* | (2012.01) |
| *G06Q 30/06* | (2012.01) |

(52) U.S. Cl.
CPC ......... *G06Q 30/08* (2013.01); *G06Q 30/0611* (2013.01); *G06Q 30/0635* (2013.01); *G06Q 50/163* (2013.01)

(58) Field of Classification Search
None
See application file for complete search history.

(56) References Cited

U.S. PATENT DOCUMENTS

| | | | | |
|---|---|---|---|---|
| 2007/0226016 A1* | 9/2007 | Gross | ................... | G06O 10/087 705/4 |
| 2009/0216552 A1* | 8/2009 | Watrous | ................. | G06Q 10/10 705/305 |
| 2009/0327024 A1* | 12/2009 | Nielsen | ............ | G06Q 10/06398 705/7.42 |
| 2013/0262029 A1* | 10/2013 | Pershing | ................ | G06Q 10/06 702/156 |
| 2015/0227893 A1* | 8/2015 | Huynh | ................... | G06Q 10/20 705/4 |
| 2017/0098178 A1* | 4/2017 | Belhaj Amor | ....... | G06Q 10/067 |

* cited by examiner

*Primary Examiner* — Mila Airapetian
(74) *Attorney, Agent, or Firm* — Trenner Law Firm, LLC; Mark D. Trenner

(57) ABSTRACT

Submission and management of project bids for property management is disclosed. An example method includes identifying at least one work order assigned to a contractor for a property. The example method also includes receiving from the contractor a property identification. The example method also includes generating a property condition report for the contractor. The example method also includes generating a plurality of questions confirming work order results. The example method also includes generating additional questions confirming the work order results. The example method also includes uploading photographs supporting the work order results. The example method also includes generating an output report having at least the property identification, the information for the property condition report, answers to the plurality of questions confirming the work order results, answers to the additional questions confirming the work order results, and at least one photograph supporting the work order results.

20 Claims, 14 Drawing Sheets

Fig. 3A

| Order No. | Due | Address | Order Type | Access | Instructions | Allowable $ |
|---|---|---|---|---|---|---|
| W122042479 | 7/5/2016 | 1108 Mai... | Tarp Roof | C9186 | Property Preservation Min Photo Requirements... | $100 |

Submit Order Results

[Contractor ID] — 322

---

Property Information

[Address] — 324

---

Select Assigned Work Orders To Submit — 326

[X] Grass Cut

[ ] Snow Removal

---

Enter Assigned Work Order Numbers — 328

[Grass Cut Order Number]

---

NEXT

Fig. 3C

Property Condition Report - Occupancy

Is property vacant or occupied?

[X] Vacant

[ ] Occupied

---

Property Condition Report - Exterior

Select Property Type

[X] Single Family

[ ] Duplex

---

Property Condition Report - Interior

Access To Interior

[X] Yes

[ ] No

[X] Carpet

[ ] Tile

---

Property Condition Report - Utilities

Select Property Type

[X] Is Electricity On?

[ ] Is Electricity Off?

---

BACK   NEXT

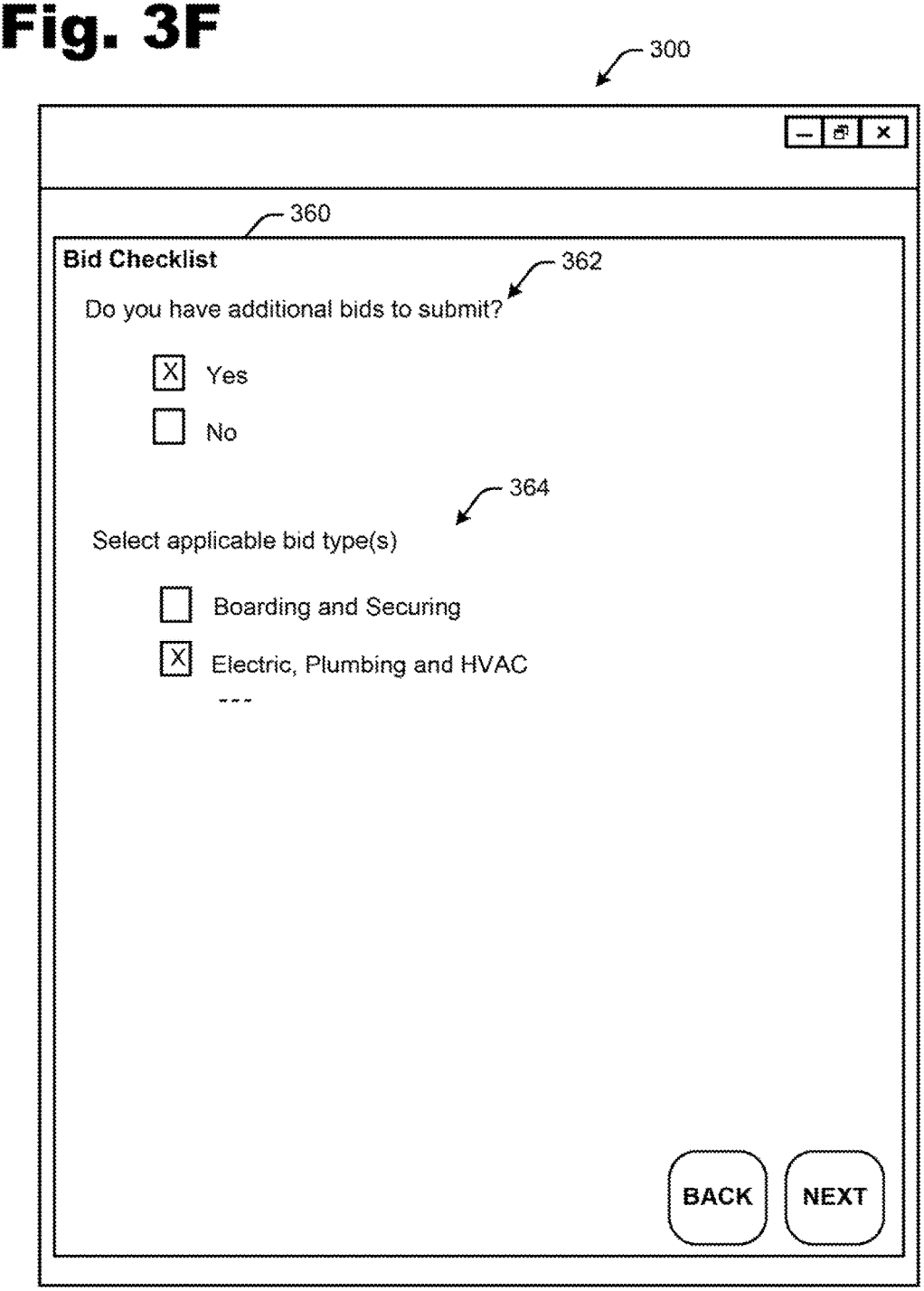

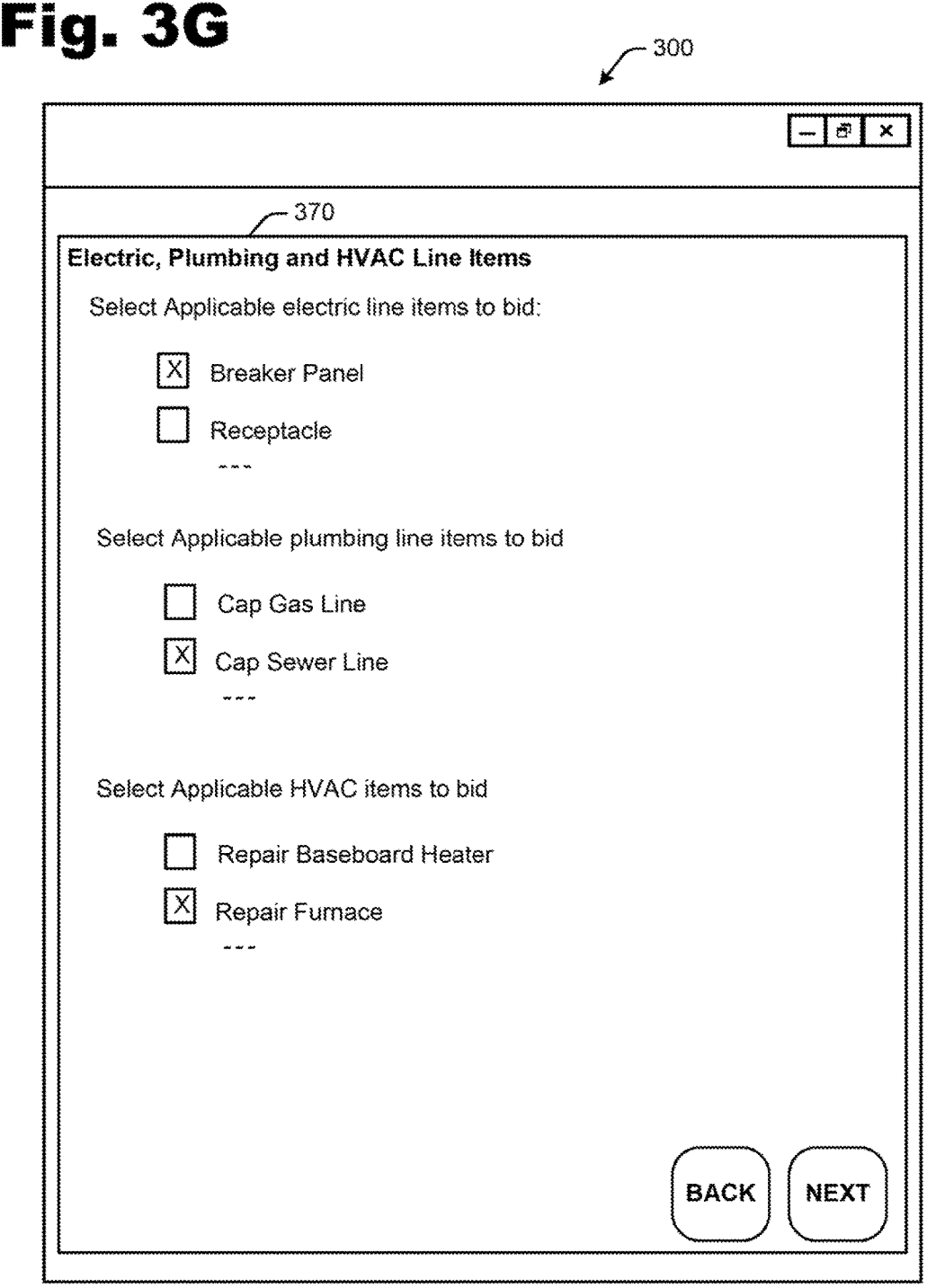

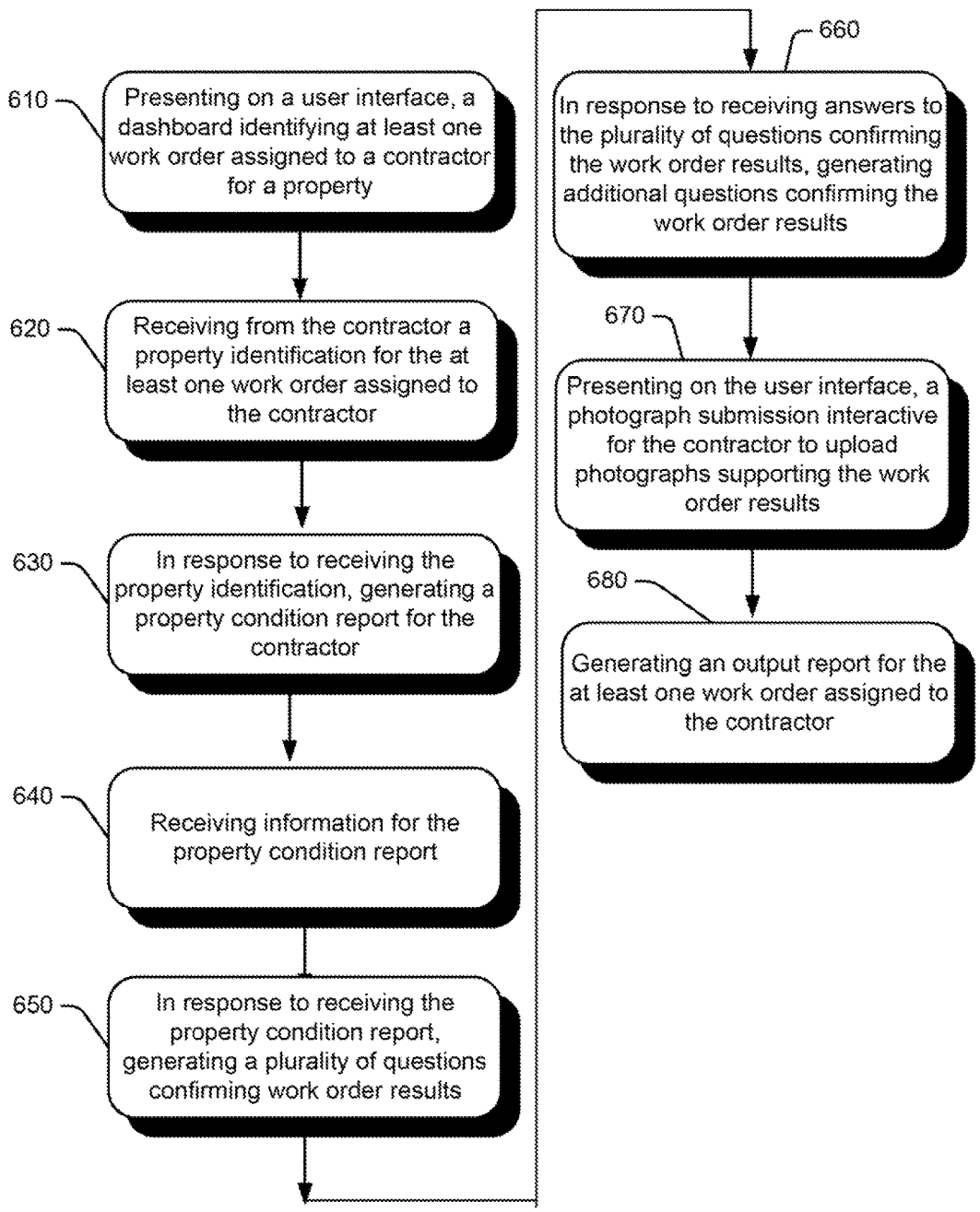

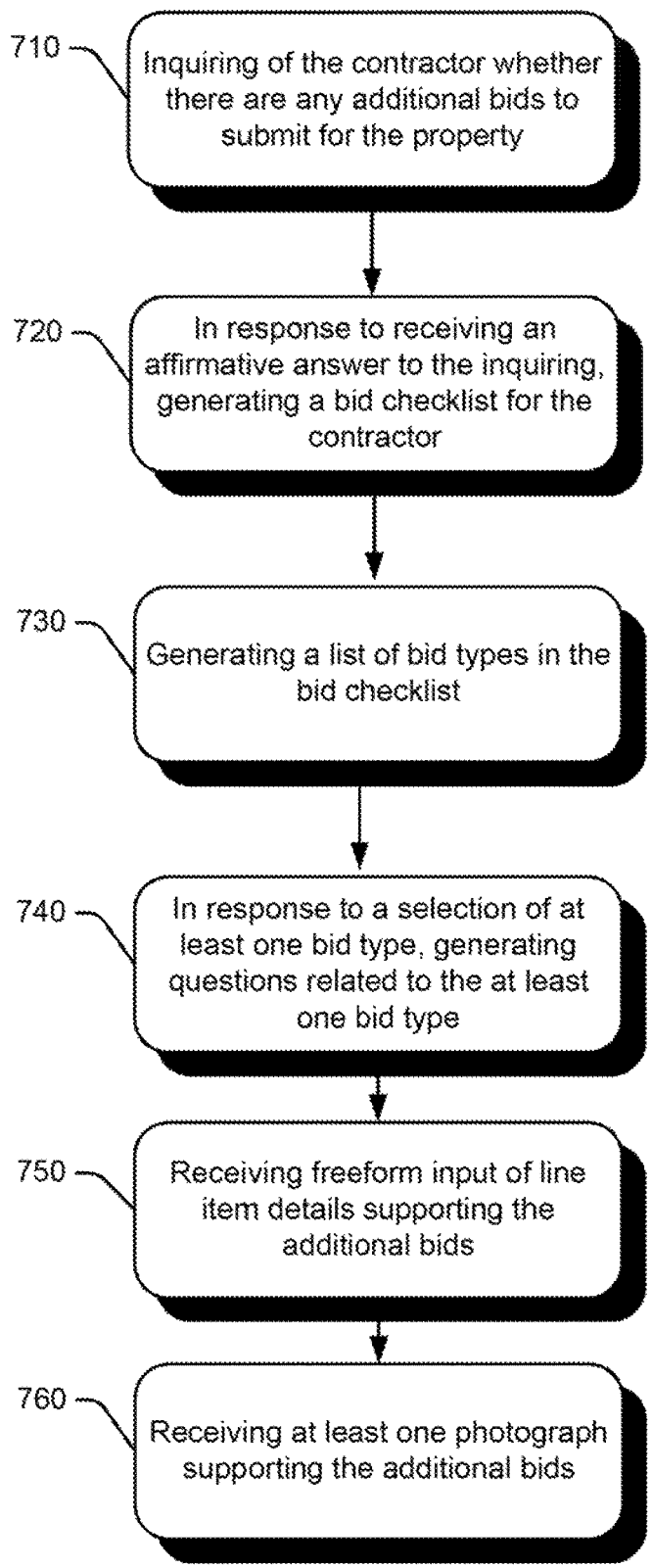

SUBMISSION AND MANAGEMENT OF PROJECT BIDS

CROSS REFERENCE TO RELATED APPLICATIONS

This application claims the priority benefit of U.S. Provisional Patent Application No. 62/198,107 filed Jul. 28, 2015 for "Method and Application for Submission and Management of Project Bids," hereby incorporated by reference in its entirety as though fully set forth herein.

BACKGROUND

Maintaining property for property owners is often outsourced when the property owner is unable to do so themselves. Examples include, but are not limited to, maintaining commercial properties, rental properties (apartments and housing), and foreclosed properties. Regardless of the type of property that needs to be maintained, contractors may be utilized for projects such as, but not limited to, mowing grass, trimming trees, cleaning up trash, painting, making repairs, etc.

BRIEF DESCRIPTION OF THE DRAWINGS

FIGS. 3A-3H is an illustration of an example user interface implementing submission and management of project bids for property management.

FIGS. 4-7 are flowcharts illustrating example operations which may implement submission and management of project bids for property management.

DETAILED DESCRIPTION

Figure 1:
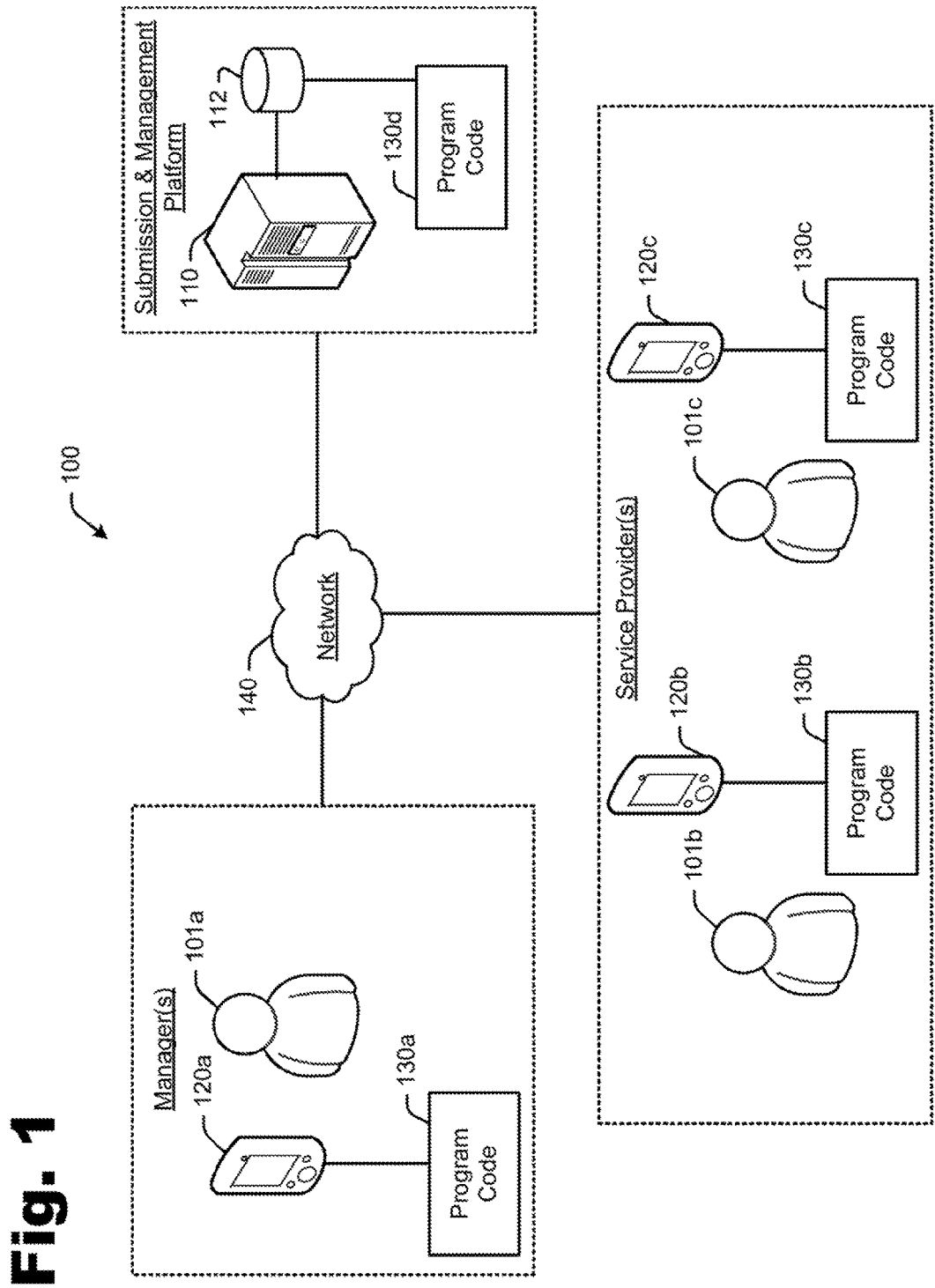
FIG. 1 is a diagram of an example networked computer system implementing submission and management of project bids for property management.

The present disclosure relates to the real property industry and more particularly to the submission of estimates and bids to undertake work on real properties. As disclosed, the submission and management of project bids for property management may be implemented at least in part by a "Master App," and may be implemented by property owners and/or managers to select and manage independent contractors for projects such as, but not limited to, landscaping, cleaning, painting, and minor construction/repair projects. The Master App may receive work order feeds from a backend platform. The Master App maybe implemented by property managers to manage the bulk inventory of property. The Master App may be implemented by contractors to submit orders. The Master App includes process controls to improve work flow via a question and answer process which may be implemented by a logic control engine and a database of any number (e.g., over 500) scenarios. The Master App is further supported by real-time data, including but not limited to, answers to questions, freeform text, pictures, and/or video.

In an example, the Master App enables third-party property owners and/or managers to oversee and manage field contractors via a network-connected (e.g., internet-based) application. The Master App may be deployed via mobile device(s) and server computer(s). The Master App is defined as a self-contained program or piece of program code (e.g., software) implemented on machines designed to fulfill a particular purpose, and/or an application, especially as downloaded and executed by a mobile device.

As used herein, the term "client" refers to the provider of work orders submitted to a property manager or third party manager ("TPM"). Example clients may be, but are not limited to, a bank, guardian, attorney or real property owner. As used herein, the property manager is typically selected to manage a new home by the client and is contractually obligated to manage the property within specific guidelines dictated by the client.

During "hand-off" of the property from the client to the property manager, the client may include sensitive information that cannot be shared with others and should be segregated from other client work orders. Clients may issue one or multiple work orders for each property. The property manager may receive orders from several clients, and is responsible for managing the maintenance of various properties. The property manager is responsible for keeping the information secure and to effectively communicate requirements to the field contractors. The property manager provides quality control and supply chain management services to the client.

Field contractors (or "contractors") are the end users of the Master App. Field contractors are the individuals or companies who perform work for the property manager (and thus ultimately, for the client). Field contractors are expected to be able to manage each work order received without access to private information of the client. Field contractors must be able to perform all tasks to the client's specific requirements despite this limitation. One of the problems the Master App solves is the arrangement and tracking of the work order(s) to be completed by the contractor(s). Typically, this work is completed very inefficiently as many times Field Contractors will spend as much time communicating with TPM about the work to be done as actually completing the assigned/selected tasks.

In an example, the Master App may implement an Order Submission process, including conditional logic which allows for many (e.g., hundreds of) different scenarios an end user can encounter onsite at a property. The Master App provides the end user with step-by-step instructions on what they need to do to complete the work order(s) within the client expectations. The Master App also provides the end user a step-by-step guide on what inspection items to report. The Master App also provides the end user an estimate checklist and an estimate calculator to streamline the work flow. The Master App also labels the photos for the end user so they are properly defined on the submission report.

The Master App increases efficiency of both the property manager and the contractors, for example, by reducing back-and-forth communications with the property manager, reducing mistakes by the contractors, and providing a compliance record in completing the work assigned. In an example, the Master App streamlines the order process for the field vendor by implementing conditional logic. Questions and answers are handled by the Master App to enable a large number (e.g., over 500) different scenarios, in real time on the same submission application.

The Master App saves the contractor time by not having to answer questions that do not pertain to the property they are working on. By way of example, the property may be a single family home, and accordingly the questions may be presented to the contractor concerning the building structure, but not questions more appropriate to a mobile home. However, when the property is a mobile home, the conditional logic and process control of the Master App may process additional questions about the size, wheels, and VIN number 10 for a Mobile Home.

The Master App may be deployed as a stand-alone application, and/or interface with other open source or proprietary work order management platforms. By way of example, the application may generate a comma separated value type file "CSV" to create an end user application that displays views of information via a programmable permission system, wherein information may be defined to include at least order instructions, compliance requirements, field training resources, and an order submission tool. The CSV file format is useable by KSpread, OpenOffice Calc and Microsoft Excel spread-sheet applications. Generation and output in CSV file format is very useful as many other applications support CSV in some fashion, to import or export data. As such, the data can be generated by any platform that can create a CSV file that works with both a manual CSV import and or with API's. The Master App may also be programmed to execute without SQL, which enables a property owner and/or manager to easily change information as needed, without plugging or confusing the database arrangement.

The Master App guards against inappropriate access to client data. By way of illustration, end user data may be viewable by the contractor on a permission basis. This limits the contractor to viewing only the data that the property manager allows. Private data fields are not imported thus there is no concern about end users getting private client information.

The Master App also streamlines requirements for all work orders regardless of the client. For example, the instructions for work orders can have downloads for required documents and step-by-step instructions nested for easy access. Once the contractor is registered and has an active account, the contractor may have access to a "Dashboard". The Dashboard displays orders that are assigned to the contractor. From here, the contractor may select "Submit Order", "Contractor Resources," and "Account Admin".

The Master App provides a streamlined environment where the contractor can fulfill multiple work requests at once, with step-by-step order fulfillment instructions, an estimate calculator and conditional logic that makes sure the contractors are provided all of the information they have to, without asking redundant or irrelevant questions for the work order and/or subject property. The Master App allows the contractor to submit results for multiple work requests per property to speed up processing time.

The Master App also enables contractors to upload photographs, and to mass identify photo uploads, for example into the following categories:

Address Verification: Confirmation that they went to the right house.
Property Condition: Photos to show the interior and exterior condition of the property
BEFORE Work Photos: Photos to show conditions before work was performed
DURING Work Photos: Photos to show conditions during working being performed
AFTER Work Photos: Photos to show the condition after the work has been completed
Estimate Photos: Photos to show why repairs are needed.
One of ordinary skill will appreciate that available applications of the prior art are limited in utility as they require field contractors to label each photo separately to show clients what they are uploading.

In an example, the contractor can take and upload photographs from their camera to the application regardless of operating system of their particular computer or mobile device. In another example, a photo editing engine may be provided to enable storage and resizing of photographs for transmission over more expensive mobile data networks and/or for later submission when a network is not readily available at the location of the property.

Before continuing, it is noted that as used herein, the terms "includes" and "including" mean, but is not limited to, "includes" or "including" and "includes at least" or "including at least." The term "based on" means "based on" and "based at least in part on."

FIG. 1 is a diagram of an example networked computer system implementing submission and management of project bids for property management. System 100 may be implemented with any of a wide variety of computing devices, such as, but not limited to, stand-alone desktop/laptop/netbook computers, workstations, server computers, blade servers, mobile devices, and appliances (e.g., devices dedicated to providing a service), to name only a few examples. Each of the computing devices may include memory, storage, and a degree of data processing capability at least sufficient to manage a communications connection either directly with one another or indirectly (e.g., via a network). At least one of the computing devices is also configured with sufficient processing capability to execute the program code described herein.

In an example, the system 100 may include a server computer 110 providing an interface to a user 101a (e.g., a property manager) and/or user(s) 101b-c (e.g., contractors) via a computing device(s) 120a-c, respectively. In an example, the server computer 110 may also provide an interface to a property owner (not shown), although in other examples, the property owner may communicate requirements to the property manager (e.g., user 101a) for interfacing with the server computer 110.

For purposes of illustration, the server computer 110 is an online data processing server with computer-readable storage 112. An example server computer 110 may include computing services (e.g., access to data sets hosted on the Internet or as dynamic data endpoints for any number of applications). Services also include interfaces to application programming interfaces (APIs) and related support infrastructure, such as application engines and hosted business services.

The computing device(s) 120a-c may be any suitable computer or computing device capable of accessing the server computer 110. Sever computer 110 and computing device(s) 120a-c are not limited to any particular type of devices. The operations described herein may be executed by program code 130a-c residing on the server computer 110 and/or one or more of the computing device(s) 120a-c.

The system 100 may also include a communication network 140, such as a local area network (LAN) and/or wide area network (WAN). In one example, the network 140 includes the Internet or other mobile communications network (e.g., a 4G mobile device network). Network 140 may also provide greater accessibility to the server computer 110 for use in distributed environments, for example, where more than one user may have input and/or receive output from the server computer 110.

The server computer 110 and/or computing device(s) 120a-c may be provided on the network 140 via a communication connection, such as via an Internet service provider (ISP). In this regard, the computing device(s) 120a-c are able to access the server computer 110 directly via the network 140, or via an agent, such as another network.

In an example, the server computer 110 also executes program code 130d (e.g., stored on storage device 112), and is accessed by the computing device(s) 120a-c in the networked computer system 100. For example, the program code 130d may be a cloud-based service, wherein the program code is executed on at least one computing device local to the computing device(s) 120a-c, but also has access to the services generated by executing the program code 130d in a cloud computing system.

It is noted that the submission and management platform may include remote source(s) of data. That is, the data source(s) may be stored at the server computer 110, and/or the source may be physically distributed in the network and operatively associated with the submission and management program. The source may include any data. For example, the source of data may include databases for providing information, applications for providing application data, storage resources for providing online storage facilities. There is no limit to the type or amount of data that may be provided by the source. In addition, the data may include unprocessed or "raw" data, or the content may undergo at least some level of processing.

As mentioned above, the program code 130a-d may be executed by any suitable computing device(s) for submission and management of project bids. In an example, the program code 130a-c is implemented as a Master App, and the program code 130d is implemented as a back-end engine. In any event, the system for submission and management of project bids for property management may include at least one mobile device for a contractor (e.g., device 120b for contractor 101b), and a user interface on the mobile device. The user interface may be configured to display a dashboard identifying at least one work order assigned to a contractor for a property. The dashboard provides user access to function of the Master App, in an example as executed by program code.

The mobile device includes a processor configured to execute program code stored on a non-transient computer readable storage medium. The program code executes to receive from the contractor a property identification for the at least one work order assigned to the contractor. In response to receiving the property identification, the program code executes to generate a property condition report for the contractor and receive information for the property condition report.

The Master App may execute a conditional logic and process control to generate the plurality of questions. Although the conditional logic may be executed as program code (e.g., the Master App), it is contemplated that the conditional logic may be implemented by logic gates (i.e., electronic device hardware).

The conditional logic and process control may include generating questions and receiving input from the contractor. In response to receiving the property condition report, the program code executing to generate a plurality of questions confirming work order results. In response to receiving answers to the plurality of questions confirming the work order results, the program code executes to generate additional questions confirming the work order results. The additional questions adding another layer of granularity to information that confirms the work order results.

Each of the questions may be selected to confirm the work order results, and may be preselected based on a workflow designed to maintain consistency of results across a variety of different types of contractors and across a variety of different types of properties. Likewise, each of the additional questions confirming the work order results may be prese-lected based on the workflow designed to maintain the consistency of results across the variety of different types of contractors and across the variety of different types of properties.

The Master App may also include, or be operated in association with, a photograph module. The photograph module may be configured to receive photographs supporting the work order results.

The Master App may also include a management server generating an output report for the at least one work order assigned to the contractor, the output report having at least the property identification, the information for the property condition report, answers to the plurality of questions confirming the work order results, answers to the additional questions confirming the work order results, and at least one photograph supporting the work order results. The output report provides evidence of completion of the at least one work order by the contractor to confirm for an off-site manager that the at least one work order was completed to a predetermined standard, without the off-site manager having to personally visit the property.

The Master App may also execute program code to inquire of the contractor whether there are any additional bids to submit for the property. In response to receiving an affirmative answer to the inquiry, the program code may execute to generate a bid checklist for the contractor having a list of bid types. In response to a selection of a bid type, the program code may execute to generate questions related to the bid type. The questions add another layer of granularity to information supporting necessity for the additional bids. In an example, the questions are specifically tailored based on the bid type. The program code may also execute to receive freeform input of line item details supporting the additional bids, and to receive at least one photograph supporting the additional bids.

Figure 2:
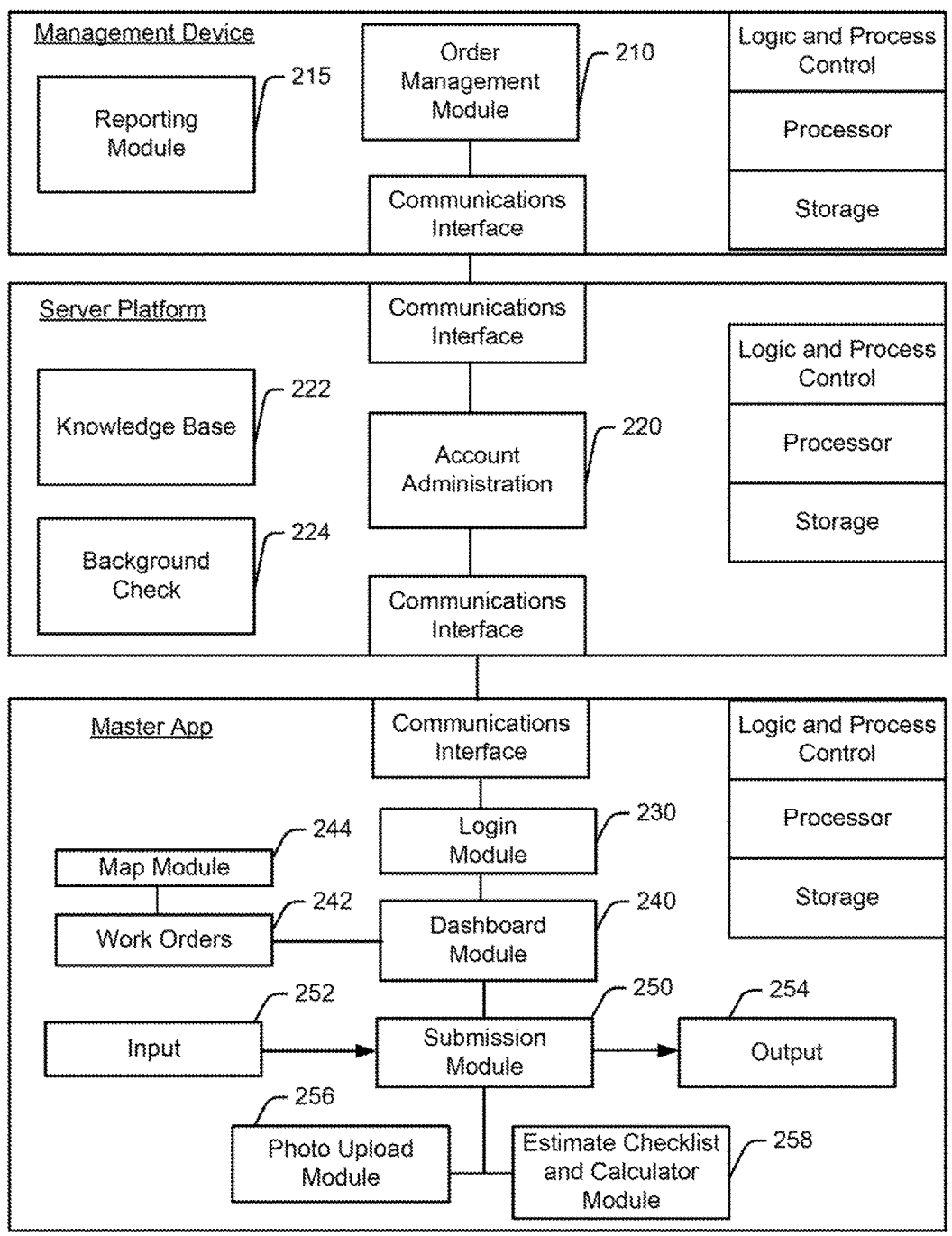
FIG. 2 shows an example architecture of machine readable instructions, which may be executed for submission and management of project bids for property management.

Program code used to implement features of the system can be better understood with reference to FIG. 2 and the following discussion of various example functions. However, the operations described herein are not limited to any specific implementation with any particular type of program code.

FIG. 2 shows an example architecture of hardware and machine readable instructions, which may be executed for submission and management of project bids for property management. In an example, the program code discussed above with reference to FIG. 1 may be implemented in machine-readable instructions (such as but not limited to, software or firmware) may implement logic and process control. The machine-readable instructions may be stored on a non-transient computer readable medium and are executable by one or more processor to perform the operations described herein. It is noted, however, that the components shown in FIG. 2 are provided only for purposes of illustration of an example operating environment, and are not intended to limit implementation to any particular system. In another example, the logic and process control may be handled by logic gates and/or other electronic components and devices.

In an example, the function of the architecture is implemented as self-contained modules. These modules can be integrated within a self-standing tool, or may be implemented as agents that run on top of an existing program code and/or devices.

In an example, the architecture of the management device (e.g., at manager mobile device 120a) may include an Order Management Module 210. Order Management Module 210 may be implemented by a property manager to generate orders based on specifics provided by a property owner. The management device may also include a reporting module 215 to handle reporting. The reporting module 215 may generate report and/or receive reports generated by the server platform and/or the Master App. Reports may be utilized by the property manager and/or the property owner to confirm the requested work in the work order has been completed. It is noted that the property manager may also submit orders and/or receive report directly, either to the property manager and/or to the server platform.

In an example, the architecture of the server platform (e.g., at submission and management server 110) may include an Account Administration Module 220. Account Administration Module 220 may be implemented to set up accounts for contractors in the system. Account Administration Module 220 may also be implemented to provide work orders for individual contractors, and to handle information from the contractor for corresponding work orders and report back to the management device.

The server platform may also implement additional modules, such as, but not limited to, a Knowledge Base 222 to provide the contractor with information such as building codes, instructional material, etc. Other modules may also include a Background Check Module 224, which may be implemented during account setup and/or maintenance, to ensure that the contractors have requisite credentials for performing the work of the work orders.

The Master App may include a Login Module 230 to communicate with the server platform. The Master App may also include a Dashboard Module 240. From the Dashboard Module 240, the contractor may access Work Orders 242. Additional information for the Work Orders (e.g., a map to the property) may be generated by additional modules, such as the Map Module 244.

The Master App may also include a Submission Module 250. The Submission Module 250 enables the contractor to submit completed work orders based on responses to questions generated by the Master App (e.g., Input 252) and generate reports (e.g., Output 254).

Additional modules may be provided with the Submission Module 250, such as a Photo Upload Module 256, to enable the contractor to submit photographs for a work order and/or for a new bid. An Estimate Checklist and Calculator Module 258 may also be provided to enable the contractor to submit new bids for additional work that may be needed on a property.

FIGS. 3A-3H is an illustration of an example user interface 300 implementing submission and management of project bids for property management. In this example, the screen displays may be displayed sequentially to the user (e.g., the contractor) in response to information received on the previous screen display. However, the disclosure is not limited to any particular ordering. Nor is the disclosure limited to any particular type or display of information being requested and/or submitted. It is noted that the dashes " - - - " shown in the drawings indicates that any information (not explicitly shown) may be requested and/or submitted.

In the example shown in FIG. 3A, the user interface 300 displays a dashboard 310 identifying at least one work order 312 assigned to a contractor for a property. In FIG. 3B, the contractor may enter the Submit Orders interface 320 for a work order assigned to the contractor. The Submit Orders interface 320 may request the Contractor ID 322 and other information (e.g., as previously noted is indicated by the dashes " - - - " in the drawings). The contractor may also enter Property information 324. The information input enables the logic and process control to identify work orders associated with the contractor and property, and display a list of assigned work orders 326 for the contractor to select for submittal. The contractor may also submit multiple work order numbers at 328.

In response to receiving the property identification and/or other information for a work order to be submitted, the Master App generates a property condition report 330 for the contractor, as shown in FIG. 3C. The property condition report 330 may be populated with property-specific questions, such as Property Occupancy 332, questions concerning the Exterior 334, questions concerning the Interior 336, and questions concerning the Utilities 338.

It is noted that the questions may be generated in response to information about the property (e.g., whether it is an apartment, a house, or a mobile home). In an example, questions that are not relevant to the particular property may be excluded, and only questions relevant to the particular property are presented to the contractor. In addition, additional questions may be populated in the interface in response to input by the contractor. For purposes of illustration, additional questions 337 about the Interior 336 may be generated for the contractor (e.g., whether there is carpet or tile) if the contractor answers that he or she has access to the interior of the property. If the contractor does not have access to the interior, then those additional questions 337 would be excluded from the property condition report.

Figure 3D:
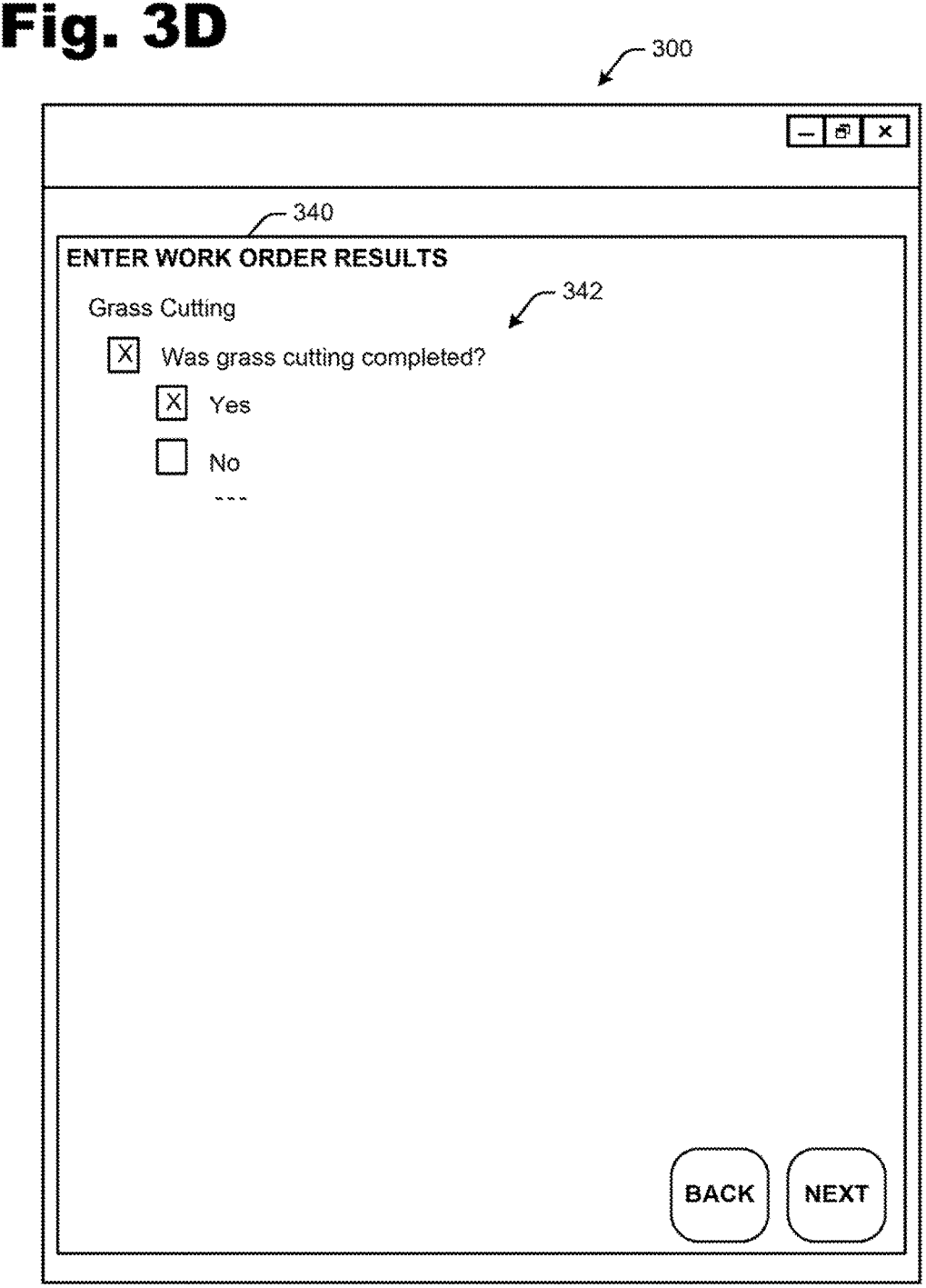
Figure 3E:
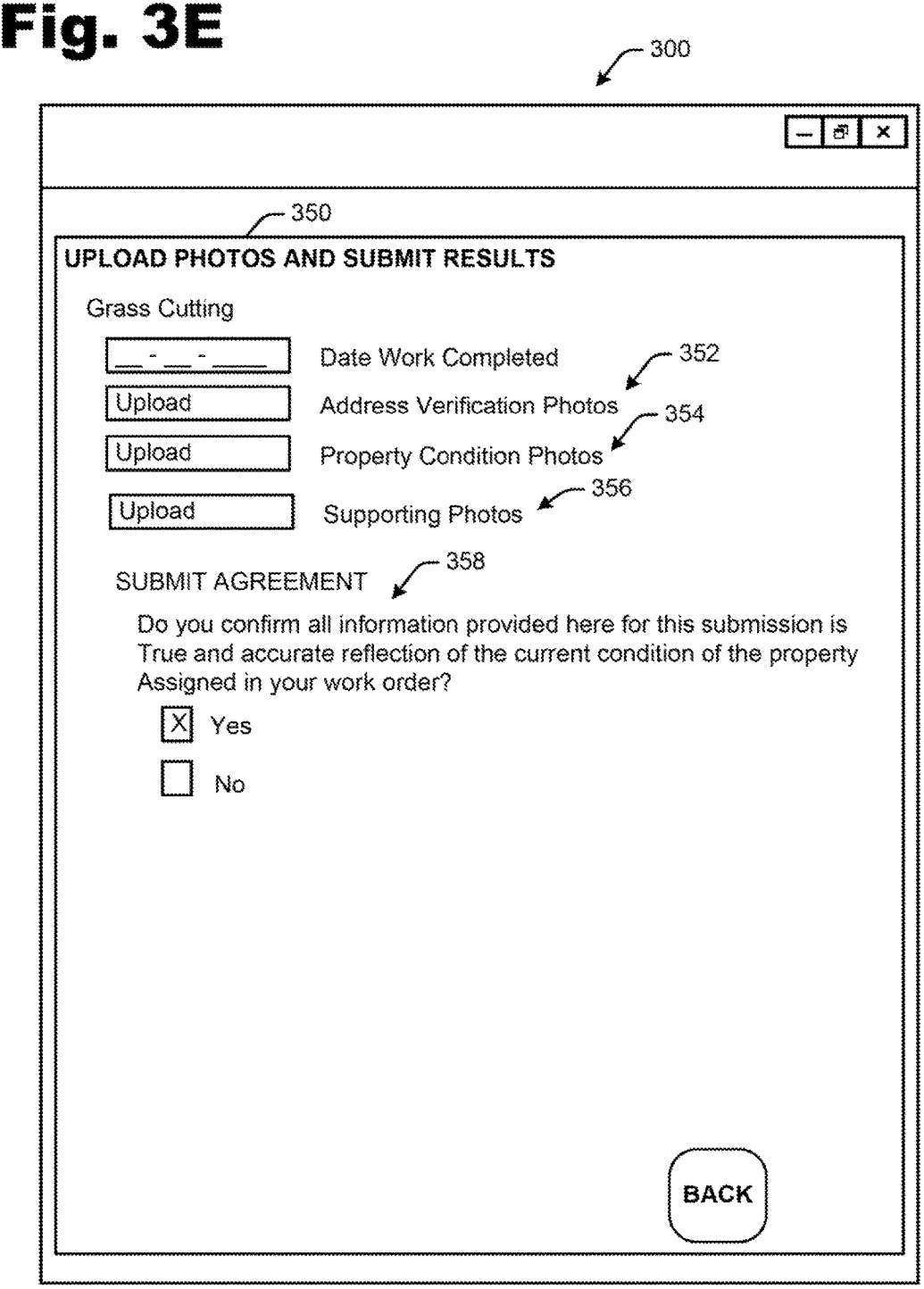

In response to receiving the property condition report, the Master App generates a plurality of questions confirming work order results. In FIG. 3D, the contractor is prompted to enter order results. Again, information is only collected that is relevant to the work order. In this illustration, the contractor is asked whether grass cutting was completed, because the work order for this particular property included a work order for grass cutting. However, other questions unrelated to the work order for this particular property would not be presented to the contractor. Again, in response to receiving answers to the questions confirming the work order results, the Master App may also generate additional questions confirming the work order results. The additional questions add another layer of granularity to information that confirms the work order results.

It is noted that each of the questions and additional questions confirming the work order results is preselected based on a workflow designed to maintain consistency of results across a variety of different types of contractors and across a variety of different types of properties.

The Master App may also present on the user interface, a photograph submission interactive 350 for the contractor to upload photographs supporting the work order results. The contractor may be asked to provide various types and numbers of photographs to verify the address 352, the property condition 354, and photographs supporting work order results 356. The contractor may also be requested to confirm all information is accurate 358.

The Master App may also generate a bid checklist for the contractor 360 to inquire 362 whether there are any additional bids to submit for the property, as shown in FIG. 3F. If the answer is No, then nothing further is requested from the contractor regarding additional bids. In response to receiving an affirmative answer to the inquiry 362, the Master App may generate a list of bid types 364 in the bid checklist 360.

In response to a selection of at least one bid type, the Master App may generate questions 370 related to the selected bid type, as shown in FIG. 3G. The questions add another layer of granularity to information supporting necessity for the additional bids. Again, the questions are not generic questions, but are specifically tailored based on the at least one bid type, in the illustration shown in FIG. 3G, only line items related to the selected bid type of Electric. Plumbing and HVAC are generated for the contractor to have to answer.

Figure 3H:
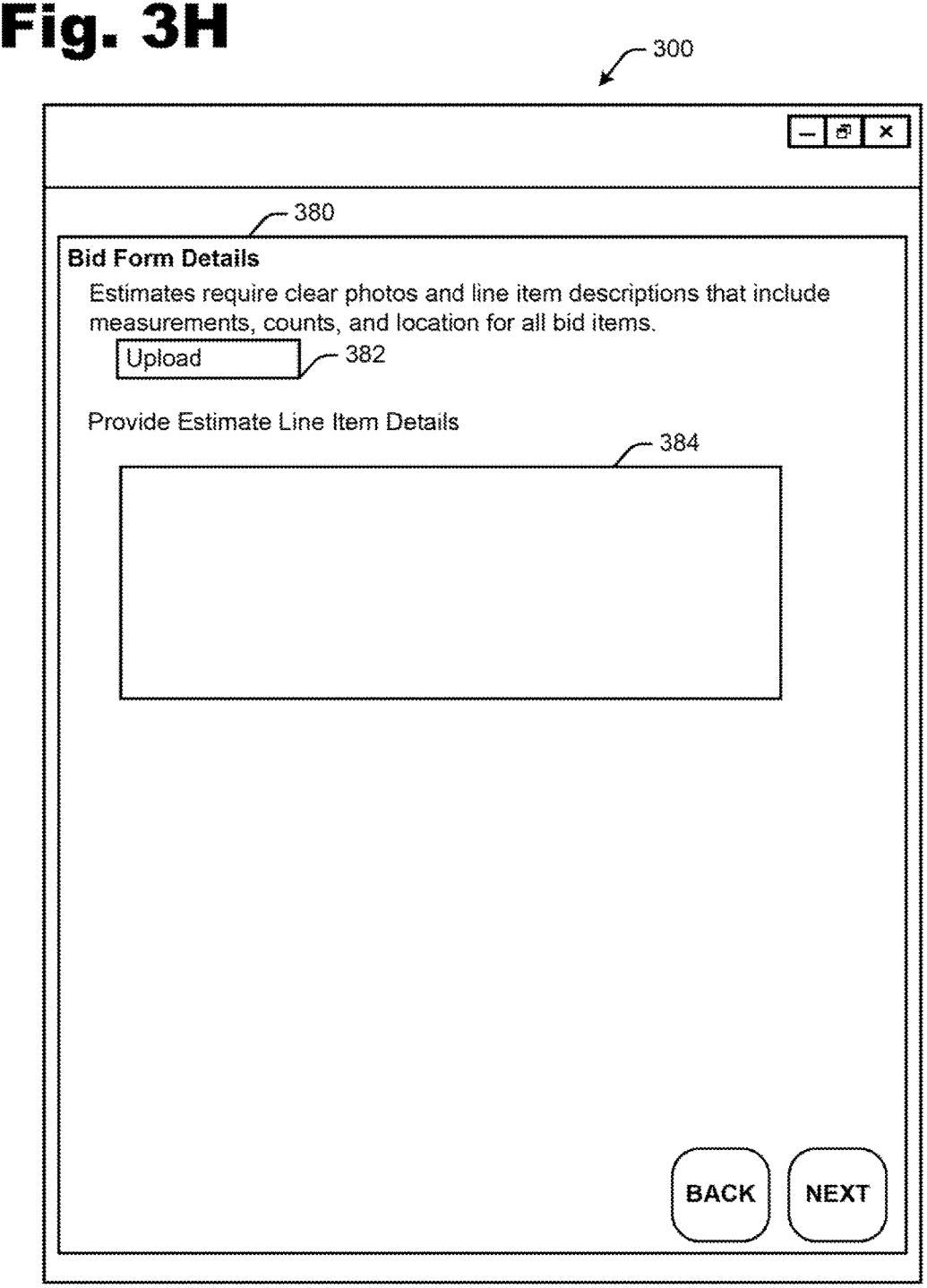

In FIG. 3H, the Master App is configured to receive bid form details 380. Examples include uploading at least one photograph 382 supporting the additional bids. The Master App is also configured to receive freeform input 384 of line item details supporting the additional bids.

Upon receiving the submitted work order, an output report may be generated. The output report may be generated at the contractor's mobile device, e.g., by the Master App. The output report may also be generated at the server computer based on information received from the Master App. Or the output report may be generated in part at the mobile device (e.g., by the Master App) and in part by the server based on information received from the Master App. The output report for the work order assigned to the contractor may have at least the property identification, the information for the property condition report, answers to the questions confirming the work order results, answers to the additional questions confirming the work order results, and at least one photograph supporting the work order results. The output report provides evidence of completion of the at least one work order by the contractor to confirm for an off-site manager that the at least one work order was completed to a predetermined standard, without the off-site manager having to personally visit the property.

Before continuing, it should be noted that the examples described above are provided for purposes of illustration, and are not intended to be limiting. Other devices and/or device configurations may be utilized to carry out the operations described herein.

FIGS. 4-7 are flowcharts illustrating example operations which may implement submission and management of project bids for property management. Operations may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

Figure 4:
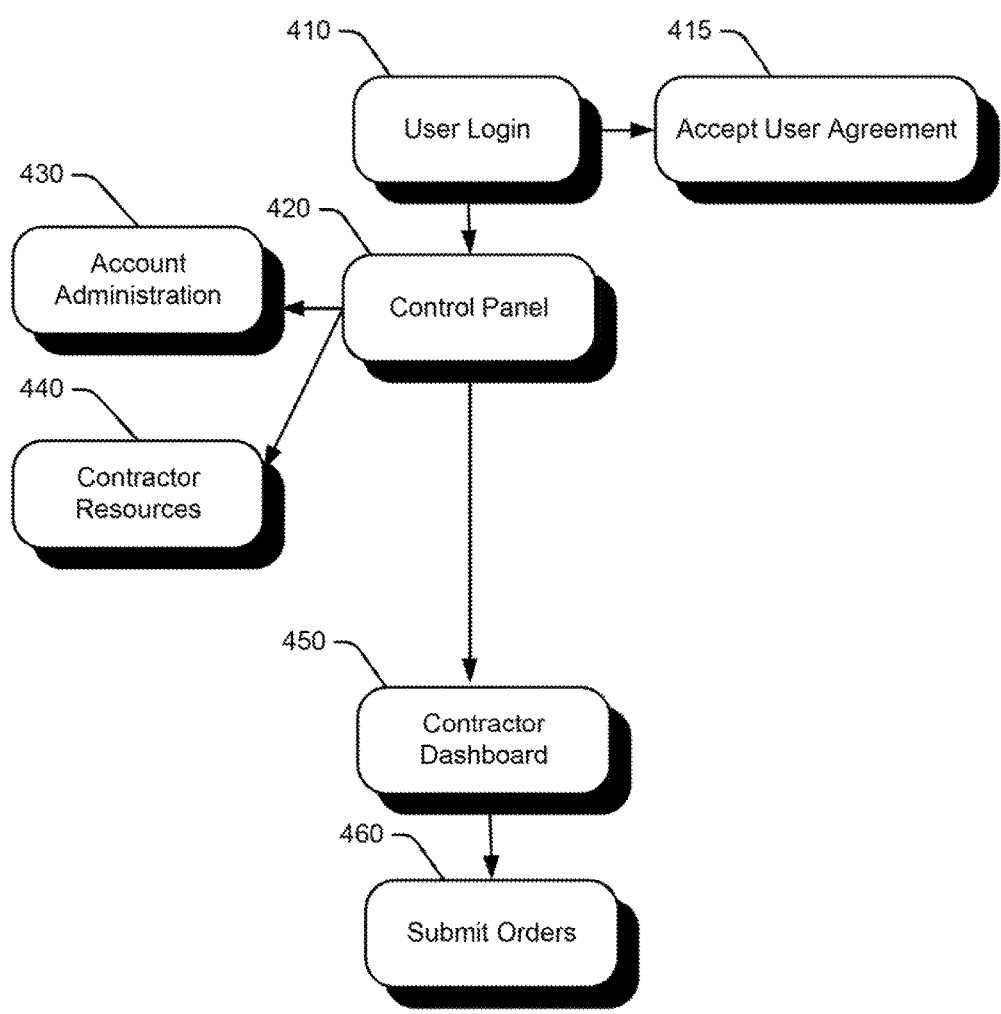

In FIG. 4, operation 410 includes a user login (e.g., the contractor to login to the Master App). The user login may require the user to accept a user agreement at operation 415. User login provides access to the control panel in operation 420. The control panel enables access to account administration (e.g., user information, password, etc.) at operation 430. The control panel may also enable access to contractor resources (e.g., learning tools for the Master App, best practices, applicable government building codes, etc.) at operation 440.

At operation 450, the control panel may enable access to a contractor dashboard. The contractor dashboard may display work orders assigned to the contractor. The contractor can submit orders at operation 460.

Figure 5:
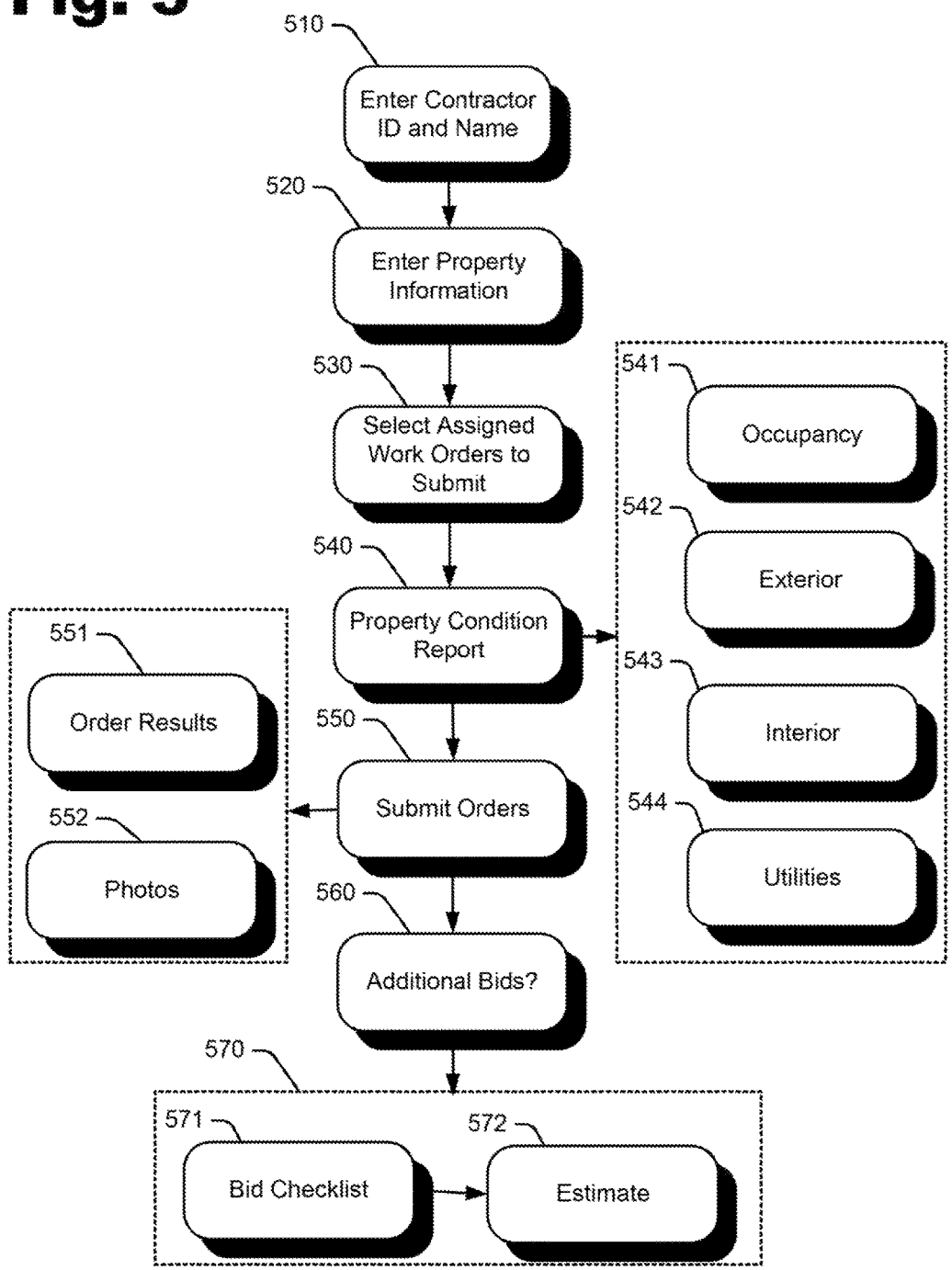

In FIG. 5, operation 510 includes entering a contractor identification and name, e.g., to login to the Master App. In operation 520, the contractor may select a property by entering property information. In operation 530, the contractor may select one or more assigned work orders for the property selected in operation 520.

Conditional logic and process control may be implemented to ask a contractor questions concerning the work order, and then to submit the work order. In operation 540, the contractor is asked to complete a property condition report. The property condition report may include questions about occupancy 541, exterior condition of the property 542, interior condition of the property 543, and utilities 544. In operation 550, the contractor may submit a work order. The contractor may be asked to complete order results 551, and upload photographs 552.

In operation 560, the contractor may be asked to submit any additional bids for the property. For example, while mowing the lawn the contractor may have noticed that the sprinklers are broken or should be winterized. The contractor can submit a bid 570 to complete the additional work. The Master App may walk the contractor through the process of submitting the bid, by utilizing a bid checklist 571, and instructions for submitting an estimated cost 572 for the project.

In FIG. 6, operation 610 includes presenting on a user interface, a dashboard identifying at least one work order assigned to a contractor for a property. Operation 620 includes at the dashboard, receiving from the contractor a property identification for the at least one work order assigned to the contractor. Operation 630 includes in response to receiving the property identification, generating a property condition report for the contractor. Operation 640 includes recent information for the property condition report. Operation 650 includes in response to receiving the property condition report, generating a plurality of questions confirming work order results. Operation 660 includes in response to receiving answers to the plurality of questions confirming the work order results, generating additional questions confirming the work order results. The additional questions add another layer of granularity to information that confirms the work order results.

It is noted that each of the questions and additional questions confirming the work order results is preselected based on a workflow designed to maintain consistency of results across a variety of different types of contractors and across a variety of different types of properties.

Operation 670 includes presenting on the user interface, a photograph submission interactive for the contractor to upload photographs supporting the work order results. Operation 680 includes generating an output report for the at least one work order assigned to the contractor. The output report may include the property identification, the information for the property condition report, answers to the plurality of questions confirming the work order results, answers to the additional questions confirming the work order results, and at least one photograph supporting the work order results.

It is noted that the output report provides evidence of completion of the at least one work order by the contractor to confirm for an off-site manager that the at least one work order was completed to a predetermined standard, without the off-site manager having to personally visit the property.

In FIG. 7, operation 710 includes inquiring of the contractor whether there are any additional bids to submit for the property. Operation 720 includes in response to receiving an affirmative answer to the inquiring, generating a bid checklist for the contractor. Operation 730 includes generating a list of bid types in the bid checklist. Operation 740 includes in response to a selection of at least one bid type, generating questions related to the at least one bid type. The questions add another layer of granularity to information supporting necessity for the additional bids. The questions may be specifically tailored based on the at least one bid type. Operation 750 includes receiving freeform input of line item details supporting the additional bids. Operation 760 includes receiving at least one photograph supporting the additional bids.

The operations shown and described herein are provided to illustrate example implementations. It is noted that the operations are not limited to the ordering shown. Still other operations may also be implemented.

The operations may be implemented at least in part using an end-user interface (e.g., web based interface). In an example, the end-user is able to make predetermined selections, and the operations described above are implemented on a back-end device to present results to a user. The user can then make further selections. It is also noted that various of the operations described herein may be automated or partially automated.

It is noted that the examples shown and described are provided for purposes of illustration and are not intended to be limiting. Still other examples are also contemplated.

The invention claimed is:

1. A method of submission and management of project bids for property management, comprising:
   presenting on a user interface, a dashboard identifying at least one work order assigned to a contractor for a property;
   at the dashboard, receiving from the contractor a property identification for the at least one work order assigned to the contractor;
   in response to receiving the property identification, generating a property condition report for the contractor;
   receiving information for the property condition report;
   in response to receiving the property condition report, generating a plurality of questions confirming work order results;
   in response to receiving answers to the plurality of questions confirming the work order results, generating additional questions confirming the work order results, the additional questions adding another layer of granularity to information that confirms the work order results;
   presenting on the user interface, a photograph submission interactive interface constructed to upload various types and numbers of photographs to verify an identity and a condition of the property prior to beginning work on the property to support a work order for the property, and to verify an identity and work order results after completing work on the property; and
   generating an output report for the at least one work order assigned to the contractor, the output report having at least the property identification, the information for the property condition report, answers to the plurality of questions confirming the work order results; answers to the additional questions confirming the work order results, and at least one photograph supporting the work order results.

2. The method of claim 1, further comprising:
   inquiring of the contractor whether there are any additional bids to submit for the property;
   in response to receiving an affirmative answer to the inquiring, generating a bid checklist for the contractor.

3. The method of claim 2, further comprising:
   generating a list of bid types in the bid checklist;
   in response to a selection of at least one bid type, generating questions related to the at least one bid type, the questions adding another layer of granularity to information supporting necessity for the additional bids, the questions specifically tailored based on the at least one bid type.

4. The method of claim 2, further comprising receiving freeform input of ine item details supporting the additional bids.

5. The method of claim 2, further comprising receiving at least one photograph supporting the additional bids.

6. The method of claim 1, wherein each of the plurality of questions confirming the work order results is preselected based on a workflow designed to maintain consistency of results across a variety of different types of contractors and across a variety of different types of properties.

7. The method of claim 6, wherein each of the additional questions confirming the work order results is preselected based on the workflow designed to maintain the consistency of results across the variety of different types of contractors and across the variety of different types of properties.

8. The method of claim 1, wherein the output report provides evidence of completion of the at least one work order by the contractor to confirm for an off-site manager that the at least one work order was completed to a predetermined standard, without the off-site manager having to personally visit the property.

9. A system comprising a management server having computer-readable storage storing program code executing by a processor submission and management of project bids for property management, the program code executing to:
   present on a user interface, a dashboard identifying at least one work order assigned to a contractor for a property;
   at the dashboard, receive from the contractor a property identification for the at least one work order assigned to the contractor;
   in response to receiving the property identification, generate a property condition report for the contractor;
   receive information for the property condition report;
   in response to receiving the property condition report, generate a plurality of questions confirming work order results;
   in response to receiving answers to the plurality of questions confirming the work order results, generate additional questions confirming the work order results, the additional questions adding another layer of granularity to information that confirms the work order results;
   present on the user interface, a photograph submission interactive interface constructed to upload various types and numbers of photographs to verify an identity and a condition of the property prior to beginning work on the property to support a work order for the property, and to verify an identity and work order results after completing work on the property; and
   generate an output report for the at least one work order assigned to the contractor, the output report having at least the property identification, the information for the property condition report, answers to the plurality of questions confirming the work order results, answers to the additional questions confirming the work order results, and at least one photograph supporting the work order results.

10. The system of claim 9, wherein the program code is further executed by the processor to:
    inquire of the contractor whether there are any additional bids to submit for the property;
    in response to receiving an affirmative answer to the inquiring, generate a bid checklist for the contractor.

11. The system of claim 10, wherein the program code is further executed by the processor to:
generate a list of bid types in the bid checklist;
in response to a selection of at least one bid type, generate questions related to the at least one bid type, the questions adding another layer of granularity to information supporting necessity for the additional bids, the questions specifically tailored based on the at least one bid type.

12. The system of claim 10, wherein the program code is further executed by the processor to receive freeform input of line item details supporting the additional bids.

13. The system of claim 10, wherein the program code is further executed by the processor to receive at least one photograph supporting the additional bids.

14. The system of claim 9, wherein each of the plurality of questions confirming the work order results is preselected based on a workflow designed to maintain consistency of results across a variety of different types of contractors and across a variety of different types of properties.

15. The system of claim 14, wherein each of the additional questions confirming the work order results is preselected based on the workflow designed to maintain the consistency of results across the variety of different types of contractors and across the variety of different types of properties.

16. The system of claim 9, wherein the output report provides evidence of completion of the at least one work order by the contractor to confirm for an off-site manager that the at least one work order was completed to a predetermined standard, without the off-site manager having to personally visit the property.

17. A system for submission and management of project bids for property management, comprising:
a mobile device for a contractor;
a user interface on the mobile device, the user interface configured to display a dashboard identifying at least one work order assigned to a contractor for a property;
a processor configured to execute program code stored on a non-transient computer readable storage medium, the program code executing to receive from the contractor a property identification for the at least one work order assigned to the contractor;
in response to receiving the property identification, the program code executing to generate a property condition report for the contractor and receive information for the property condition report;
in response to receiving the property condition report, the program code executing to generate a plurality of questions confirming work order results;
in response to receiving answers to the plurality of questions confirming the work order results, the program code executing to generate additional questions confirming the work order results, the additional questions adding another layer of granularity to information that confirms the work order results;
a photograph module interface constructed to upload various types and numbers of photographs to verify an identity and a condition of the property prior to beginning work on the property to support a work order for the property and to verify an identity and work order results after completing work on the property; and
a management server generating an output report for the at least one work order assigned to the contractor, the output report having at least the property identification, the information for the property condition report, answers to the plurality of questions confirming the work order results, answers to the additional questions confirming the work order results, and at least one photograph supporting the work order results.

18. The system of claim 17, further comprising:
at the mobile device, the program code executing to inquire of the contractor whether there are any additional bids to submit for the property;
in response to receiving an affirmative answer to the inquiring, the program code executing to generate a bid checklist for the contractor having a list of bid types; and
in response to a selection of at least one bid type, the program code executing to generate questions related to the at least one bid type, the questions adding another layer of granularity to information supporting necessity for the additional bids, the questions specifically tailored based on the at least one bid type.

19. The system of claim 18, further comprising:
at the mobile device, the program code executing to receive freeform input of line item details supporting the additional bids; and
at the management server, receiving at least one photograph supporting the additional bids.

20. The system of claim 17, wherein:
each of the plurality of questions confirming the work order results is preselected based on a workflow designed to maintain consistency of results across a variety of different types of contractors and across a variety of different types of properties;
each of the additional questions confirming the work order results is preselected based on the workflow designed to maintain the consistency of results across the variety of different types of contractors and across the variety of different types of properties; and
the output report provides evidence of completion of the at least one work order by the contractor to confirm for an off-site manager that the at least one work order was completed to a predetermined standard, without the off-site manager having to personally visit the property.

* * * * *